(12) United States Patent
Olofson et al.

(10) Patent No.: US 6,706,403 B1
(45) Date of Patent: Mar. 16, 2004

(54) RIGID SUBSTRATE LAMINATION ADHESIVE

(75) Inventors: Peter M. Olofson, Oakdale, MN (US); Kent W. Morris, Santa Rosa, CA (US); Michael C. Palazzotto, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/570,221

(22) Filed: May 12, 2000

(51) Int. Cl.$^7$ ............................................... B32B 27/38
(52) U.S. Cl. ..................... 428/413; 428/447; 522/25; 522/29; 522/31
(58) Field of Search ................................ 428/413, 447; 522/25, 29, 31

(56) References Cited

U.S. PATENT DOCUMENTS

| | | |
|---|---|---|
| 3,449,184 A | 6/1969 | Balk |
| 3,558,422 A | 1/1971 | Hamilton et al. |
| 3,729,313 A | 4/1973 | Smith |
| 4,101,513 A | 7/1978 | Fox et al. |
| 4,297,401 A | 10/1981 | Chern et al. |
| 4,318,766 A | 3/1982 | Smith |
| 4,341,576 A | 7/1982 | Lewis |
| 4,385,951 A | 5/1983 | Pressau |
| 4,401,537 A | 8/1983 | Chern et al. |
| 4,717,605 A | 1/1988 | Urban et al. |
| 5,328,940 A | 7/1994 | Zimmer |
| 5,554,664 A * | 9/1996 | Lamanna et al. ............. 522/25 |
| 5,578,657 A | 11/1996 | Inoue et al. |

FOREIGN PATENT DOCUMENTS

| | | |
|---|---|---|
| DE | 32 25 691 | 5/1983 |
| EP | 0 389 927 | 10/1990 |
| GB | 2 029 041 | 3/1980 |
| JP | 6-228274 | 8/1994 |
| JP | 07076615 | 3/1995 |
| JP | 11-181390 | 7/1999 |
| JP | 11236247 | 8/1999 |
| WO | WO99/48945 | 9/1999 |

OTHER PUBLICATIONS

Zumdahl, Steven S., Chemistry, 1989, D.C. Heath and Company, second edition, p. 264.*
International Journal of Adhesion & Adhesives 1999, 19, 453–454.
J. Appl. Polym Sci. 1991, 42(8), 2141–2148.
Proc.–Electron. Compon. Technol. Conf. 1998, 1178–1185.
J. Am. Chem. Sco., 81, 342 (1959) by Beringer, et al.
"Laminated Materials Glass," *Kirk–Othmer Encyclopedia of Chemical Technology*, 4$^{th}$ Ed.

* cited by examiner

*Primary Examiner*—Robert Dawson
*Assistant Examiner*—Christopher Keehan

(57) ABSTRACT

A process, system, and materials for lamination of anti-reflective glass to the screen of a CRT display, including a polymerizable adhesive and laminated articles are described. The photopolymerizable adhesive composition including, in certain embodiments, an epoxy resin and a photosensitive initiating system are disclosed.

18 Claims, 8 Drawing Sheets

RIGID SUBSTRATE LAMINATION ADHESIVE

FIELD OF THE INVENTION

The present invention is directed to processes for laminating rigid substrates, systems for laminating rigid substrates, adhesives for laminating rigid substrates, and products laminated using the processes, systems, and adhesives of the invention. In particular, the present invention includes processes and systems for laminating two or more rigid substrates to one another.

BACKGROUND OF THE INVENTION

Cathode ray tubes (also known as CRTs) are specialized vacuum tubes which produce images by striking a phosphorescent surface with electron beams. CRTs are commonly used in television sets, computer monitors, and other displays. Typical CRTs include at least one electron gun, a glass tube, and a glass screen or display. The interior surface of the screen contains phosphors, and the electron gun generates beams of electrons that strike the phosphors and produce visible spots of light.

CRTs have been in use for decades, and the screens (that portion exposed to viewers) of traditional CRTs have a slightly convex exterior surface. This convex exterior surface has been necessary in part to maintain the strength of the screen, but results in undesirable distortion of the image. In recent years technological advances in CRT design and manufacturing have permitted the creation of CRTs that have flat or nearly flat screens. These flat CRTs create less image distortion than previous curved CRTs, and result in an improved display.

The tube and screen of CRTs are manufactured from glass. The various properties of glass, including temperature stability, light transmission, scratch resistance, durability, and electrical resistance make it an excellent CRT material. Unfortunately, the glass used in most CRTs is relatively reflective. This reflectiveness can result in distracting and annoying reflections in the CRT display. Therefore it is desirable to improve on CRT displays by providing a surface on the CRT display that reduces reflection.

One approach to providing a low reflective CRT screen is to position a transparent after-market anti-reflective surface in front of the screen. These anti-reflective surfaces, such as antireflective filters sold by Minnesota Mining and Manufacturing Company (3M) of St. Paul, Minn. can be very useful at reducing reflection, and are particularly effective because they permit retrofitting and a improvement of millions of existing CRTs. Although these anti-reflective after-market products are well suited for many purposes, it would also be desirable to secure during manufacture an anti-reflective material directly to the front surface of the CRT or other flat glass display, such as plasma displays. This would permit the anti-reflective surface to be durable and inconspicuous.

An alternative approach for providing a low reflective screen is the use of anti-reflective materials such as anti-reflective glass and coatings on polymeric films. Anti-reflective optical films, including optical films for cathode ray tubes and flat panel displays have been produced. Unfortunately, these films have generally failed to provide the same level of anti-reflectiveness as glass, are more easily scratched, and are not as flat as most anti-reflective glass.

In contrast, anti-reflective glass is a good material for reducing reflection. Anti-reflective glass is durable, has good anti-reflective properties, and can be produced such that it is very flat. Unfortunately, anti-reflective glass is a rigid or substantially rigid material that is difficult to permanently adhere to the front of CRTs. One problem associated with adhering glass to the front of a CRT is that air bubbles are easily entrapped between the glass and the CRT when the glass is bonded to the CRT. This problem is significant because even a single bubble trapped between the two panels can diminish the effectiveness of the display if the bubble is readily visible. A need also exists for a method to adhere the glass to the CRT that is quick and cost effective, with a minimum of waste.

In addition to methods and systems for adhering anti-reflective glass to CRTs, a general need exists for methods and systems for adhering other rigid substrates to CRTs and other displays. For example, it is often desirable to install a polarizing material on the outside of CRTs, including rigid glass polarizing filters. These polarizers may include circular polarizers. Such rigid substrates are also desirably installed on other types of substrates besides CRTs, including liquid crystal displays, plasma display panels, and other flat displays. Other useful rigid substrates include antistatic materials, anti-radiation substrates, and conductive substrates (such as those with an iridium tin oxide (ITO) coating). Although it is desirable to adhere these rigid substrates to one another, it is often difficult to efficiently and economically conduct such processes with a minimum of waste and with a consistently high quality product that is free of defects.

Therefore a need exists for a method and system to adhere two rigid or substantially rigid substrates together, including a method and system for adhering a glass sheet to a CRT display or other type of display.

SUMMARY OF THE INVENTION

The present invention is directed to methods, systems, and materials for adhering rigid substrates to one another. The invention includes a process for lamination of anti-reflective glass to the screen of a CRT display, particularly to a flat-screen CRT display. The invention also includes processes and systems for laminating other rigid and substantially rigid materials to one another.

The method may include providing a first rigid substrate having a first surface, and a second rigid substrate having a second surface. The first rigid substrate is distorted to create a curvature in the first surface, and an adhesive composition is applied to at least a portion of the second surface of the second rigid substrate. The curvature of the first surface of the first substrate is brought in contact with the adhesive on the second surface in order to form an-interface having a contact front. Thereafter, the contact front of the adhesive advances across at least a portion of the second substrate in order to distribute the adhesive between the two rigid substrates and permit their bonding together. The order of performing these steps is typically not critical, and the steps may be performed in different orders.

In one implementation of the invention the first rigid substrate comprises a sheet of anti-reflective glass, and/or other optical coated glass such as glass with a transparent conducting coating or neutral density coating, and the second rigid substrate comprises a screen of a flat CRT or other display. The process and system allow for bonding of the anti-reflective glass to the CRT with reduced likelihood of entrapping air bubbles between the two substrates, thereby permitting consistent high quality displays having low reflectivity and few defects, if any, in the lamination between the substrates.

As used herein, the term "rigid substrate" refers to substrates that are rigid or substantially rigid. For example, rigid substrates include glass sheets and rigid polymeric sheets. The first rigid substrate should have enough flexibility to allow deformation sufficient to allow formation of a curve in the first surface. Typically, the first rigid substrate is a thin sheet of glass which has adequate flexibility for the methods and process of the invention. The glass is typically less than 3.3 millimeters in thickness, and more typically less than 1.6 millimeters in thickness. However, other thicknesses of this first rigid substrate are appropriate provided a shallow curve can be formed in the substrate. The second rigid substrate is not typically deformed during application of the first rigid substrate. Therefore, the second rigid substrate can be as rigid as, or more rigid than, the first rigid substrate.

As used herein, the term flat includes surfaces that are substantially flat. It will be appreciated that even flat surfaces as used herein will have measurable variations, and are therefore not perfectly planer. For example, a flat surface as used herein may have a standard deviation in surface elevation from about 0.1 to 0.6 mm, and typically from about 0.2 to 0.3 mm. Although the present invention is well suited to use on flat surfaces, it is also suitable for use on various surfaces that have curvature, typically a slight curvature, or slight surface irregularities.

The above summary of the present invention is not intended to describe each disclosed embodiment of the present invention. This is the purpose of the figures and the detailed description which follow.

BRIEF DESCRIPTION OF THE DRAWINGS

Other aspects and advantages of the invention will become apparent upon reading the following detailed description and upon reference to the drawings in which.

Figure 1:
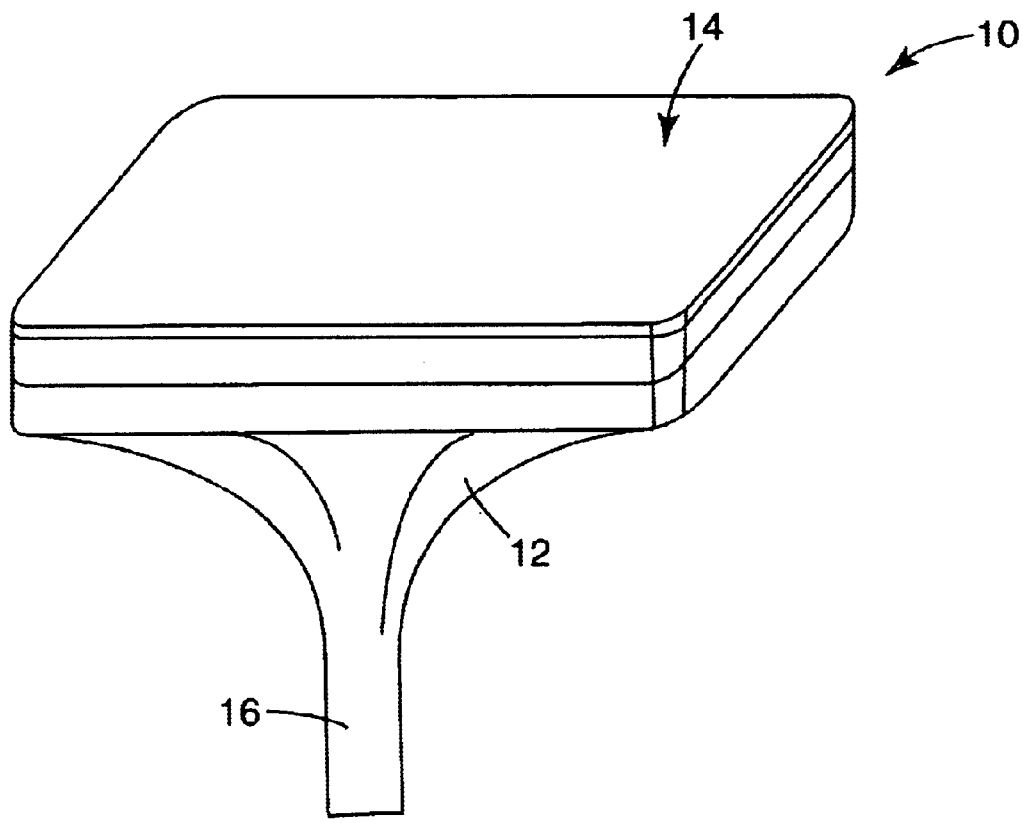
FIG. 1 is a simplified perspective view of a CRT showing a tube and screen in accordance with an implementation of the invention.

While the invention is susceptible to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

The present invention is directed to methods and systems for adhering rigid substrates to one another, and to articles made using the methods and systems of the invention. The invention is well suited to lamination of various rigid substrates to one another, and is particularly well suited to lamination of transparent rigid substrates when it is desirable to prevent entrapment of visible bubbles between the substrates. The invention is also well suited to uses where inspection of the two substrates is desired prior to final lamination of the substrates to one another. One implementation of the invention is the lamination of anti-reflective glass to the screens of displays, including to flat-screen CRT displays. The system and process permit efficient lamination without significant entrapment of air bubbles between the anti-reflective glass and the display.

In one aspect of the invention, the method includes providing a first rigid substrate, such as a sheet of antireflective glass, and a second rigid substrate, such as a CRT display. The first rigid substrate is bent to form a curve having convex and concave surfaces. An adhesive is applied to the second rigid substrate, after which the convex side of the first rigid substrate is brought in contact with this adhesive. An interface forms between the first substrate and the adhesive, and this interface has a contact front which forms at the edge of the adhesive where it meets portions of both substrates that are free of adhesive. This contact front advances across the substrates toward the edges to allow air to escape from between the substrates and thereby avoid entrapment of air bubbles.

The process and system of the invention are further understood by reference to the figures. FIG. 1 shows a perspective view of a CRT 10 including tube 12, screen 14 and electron beam source 16. The depicted CRT 10 is shown for demonstrative purposes, and in other implementations of the invention the CRT may have a different configuration. In addition, as discussed above, the invention is suitable to other applications besides lamination to CRT displays.

Figure 2:
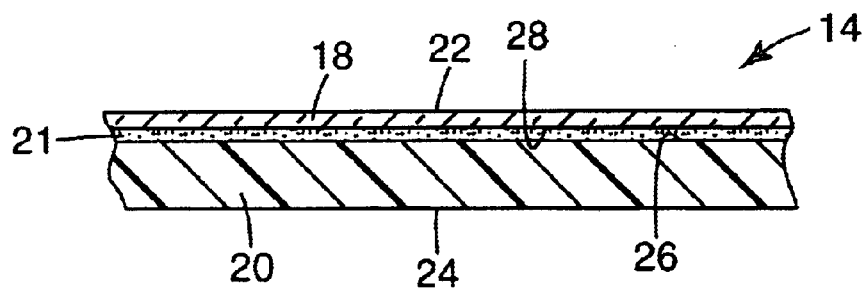
FIG. 2 is a fractional cross section of a screen of a CRT constructed and arranged in accordance with the invention, showing an anti-reflective glass sheet adhered to the screen in accordance with an implementation of the invention.

A cross section of screen 14 is shown in fragmentary view in FIG. 2. Screen 14 includes a first rigid glass substrate 18 laminated to a thicker second rigid substrate 20 by adhesive composition 21. The layer of adhesive composition 21 is typically considerably thinner than first or second substrates 18, 20. Thus FIG. 2 is drawn for illustrative purposes and the thickness dimensions are not to scale.

Screen 14 includes an exterior surface 22 and an interior surface 24. Exterior surface 22 is exposed to viewers, while interior surface 24 is directed toward the electron beam source (not shown in FIG. 2). An outer surface 26 of the second substrate 20 is adhered to the inner surface 28 of the first substrate 18 with adhesive 21. The depicted composite screen includes first substrate 18, under which is the layer of adhesive 21 and second substrate 20. The embodiment depicted shows lamination of two rigid substrates together. Additional rigid substrates may be laminated over the first rigid substrate in accordance with the invention. For example, if the first rigid substrate is a polarizing material, an additional anti-reflective substrate can be laminated over the top of this first rigid substrate. Also, the substrates can be coated with additional materials, such as various protectants, or flexible substrates can be laminated over the rigid substrates. However, the present invention is typically used to laminate only first and second rigid substrates together.

Figure 3A:
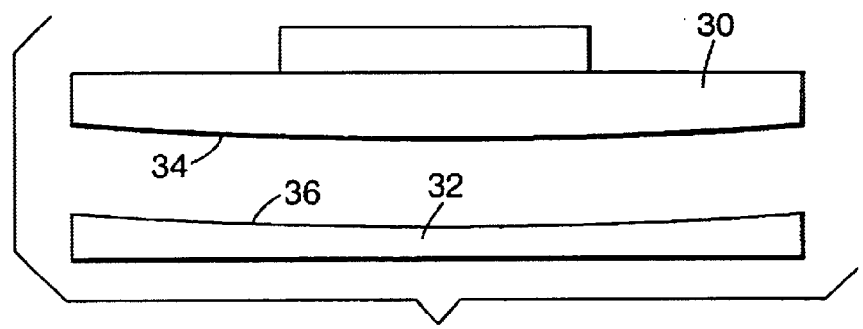
FIG. 3A is a side elevational view of a chuck used for bending and retaining a rigid substrate in accordance with an implementation of the invention.
Figure 3B:
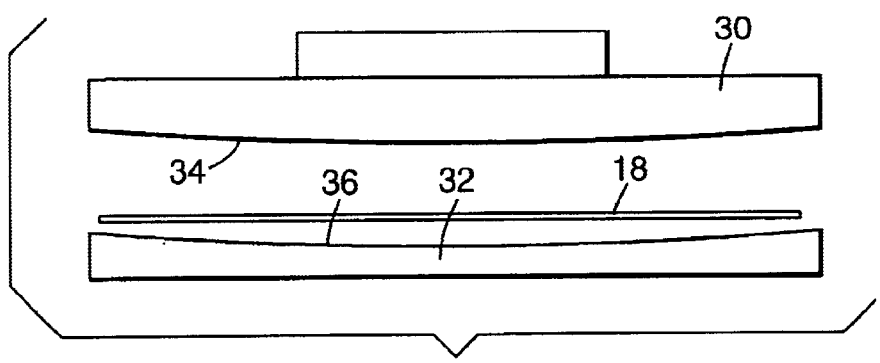
FIG. 3B is a side elevational view of a chuck used for bending and retaining a rigid substrate in accordance with an implementation of the invention, showing a rigid substrate positioned on the chuck.
Figure 3C:
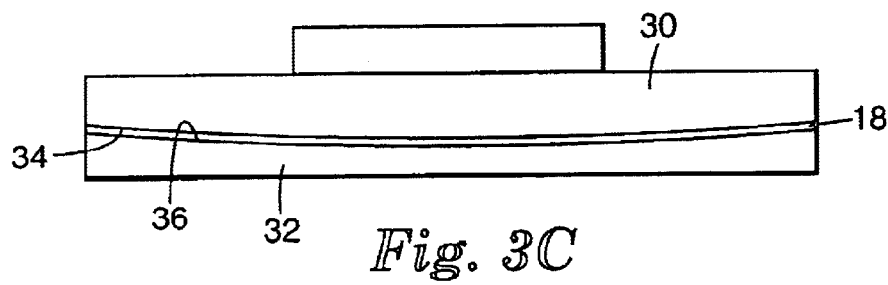
FIG. 3C is a side elevational view of a chuck used for bending and retaining a rigid substrate in accordance with an implementation of the invention, showing the rigid substrate bent to conform to the chuck.
Figure 3D:
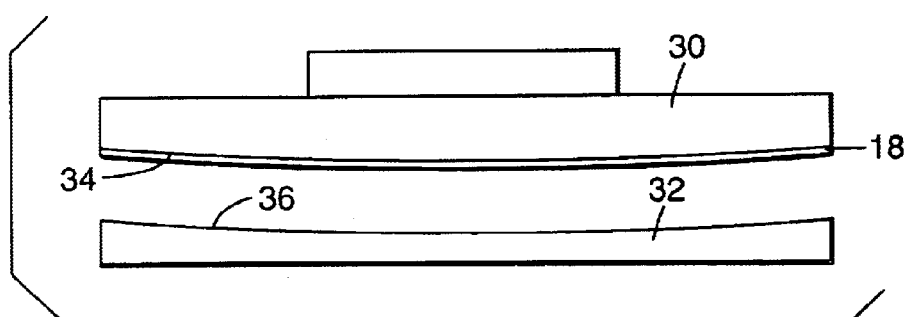
FIG. 3D is a side elevational view of a chuck used for bending and retaining a rigid substrate in accordance with an implementation of the invention, showing the rigid substrate retained by the chuck.

An implementation of the process by which the first and second substrates are adhered to one another is shown more specifically in subsequent figures. FIGS. 3A through 3D demonstrate deformation of the first substrate 18 prior to bringing it in contact with the adhesive 21 on the second substrate 20. In particular, FIG. 3A shows a chuck 30 and a form 32. Chuck 30 and form 32 nest together along curved surfaces 34 and 36, respectively, in specific implementations of the invention. Chuck 30 is configured such that its curved surface 34 may be brought toward the curved surface 36 of form 32. First substrate 18 is positioned between the chuck 30 and form 32, as shown in FIG. 3B. Chuck 30 is subsequently brought in contact with rigid substrate 18, which is pressed and bends to conform to the curved surfaces 34, 36 of the chuck and form 30, 32 as shown in FIG. 3C. Rigid substrate 18 may be deformed in only one dimension, or can be deformed in two dimensions. After the rigid substrate 18 has been deformed, it is temporarily held in place on chuck 30, such as by a vacuum force.

The first substrate is thus deformed to create a curved surface having at least a portion that is concave and a portion that is convex. Although the presently described embodiment uses a chuck to bend the first rigid substrate, other methods of bending the substrate may be used. For example, pressure may be applied to opposite edges of the substrate to force the substrate to bend. Also, a chuck may be used without a form, or a bendable chuck may be used. Alternately, the edges of the substrate may be held and turned upright to create a bend. However, use of a vacuum chuck is preferred because it allows a thin substrate to be easily picked up from a stack of substrates, and to be quickly and completely released from the chuck.

Figure 4A:
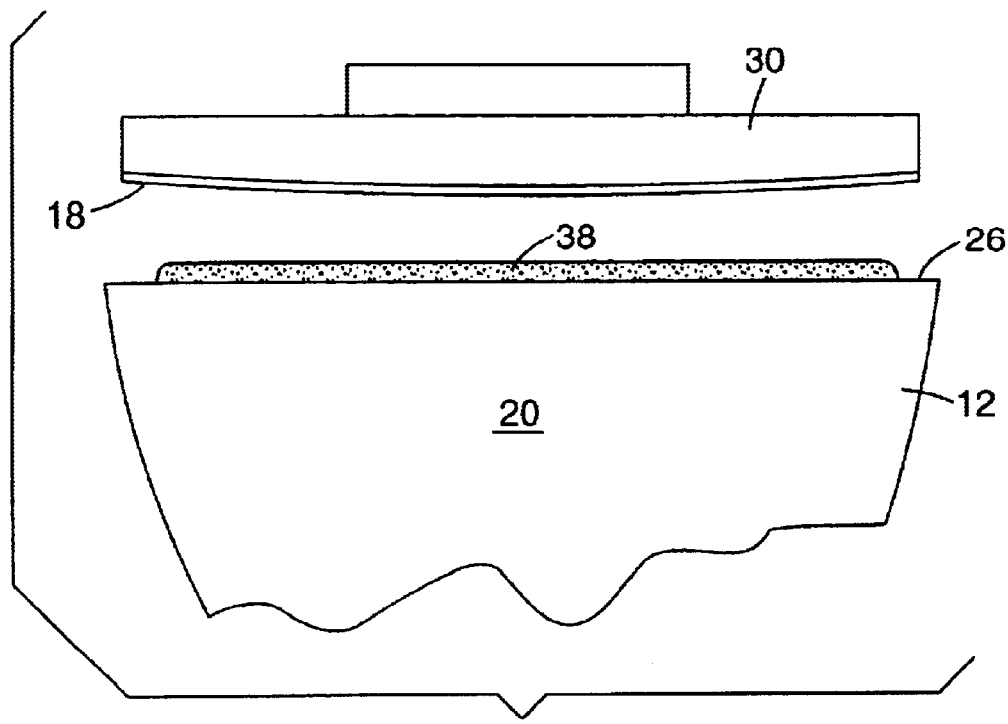
FIG. 4A is a side elevational view of a chuck retaining a rigid substrate prior to placement of the rigid substrate on a display (the display is shown in fractional view with the electron gun removed). The drawing is provided for demonstrative purposes, and is not drawn to scale. Also, the adhesive is shown in a contrasting shade in this figure and subsequent figures, even though actual adhesive is preferably transparent.
Figure 4B:
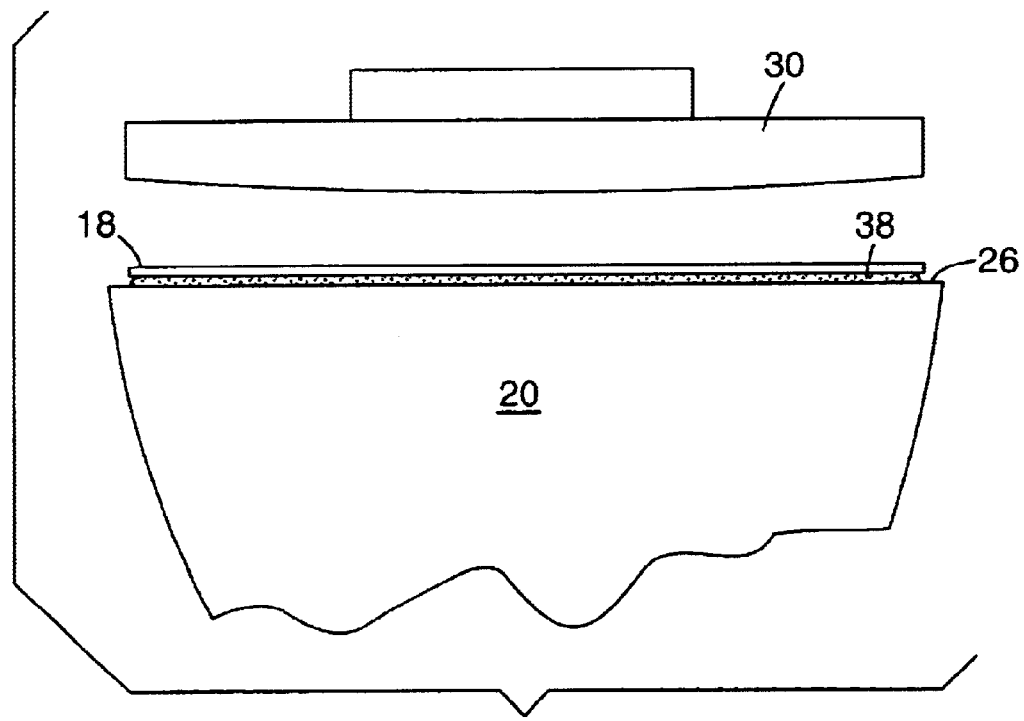
FIG. 4B is a side elevational view of a rigid substrate after placement of the rigid substrate on a display (the display is shown in fractional view with the electron gun removed). The drawing is provided for demonstrative purposes, and is not drawn to scale.

After deformation of first rigid substrate 18, chuck 30 is retracted from form 32. Chuck 30 is subsequently used to position the second rigid substrate, which is tube 12 of a CRT in the depicted embodiment, and which is shown in FIGS. 4A and 4B. Specifically, FIG. 4A shows a side elevational view of chuck 30 retaining first rigid substrate 18 prior to placement on adhesive 38 on the exterior surface 26 of second substrate 20. FIG. 4B shows a side elevational view of chuck 30 after placement of first substrate 18 on the second substrate 20. Adhesive composition 38 is between the substrates. Thus, FIGS. 4A and 4B show the first substrate 18 before and after it has been positioned on the second substrate 20.

First substrate 18 is preferably brought in contact with the adhesive in a manner that reduces the likelihood of entrapping bubbles of air or other gases between the first substrate 18 and second substrate 20. This contact includes making initial contact between first substrate 18 and the adhesive 38 at a relatively small portion of adhesive 38 and then releasing first substrate 18 so that the interface area expands toward the edges of the substrates 18, 20. Typically, release occurs after the first substrate 18 is pressed approximately one half way into the adhesive.

Figure 5A:
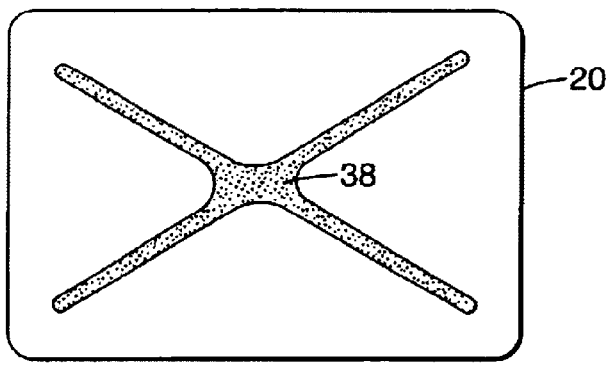
FIG. 5A is a top plan view of a first pattern for deposit of adhesive on the screen of a CRT in accordance with an implementation of the invention, prior to placement of the anti-reflective glass on the CRT screen.
Figure 5B:
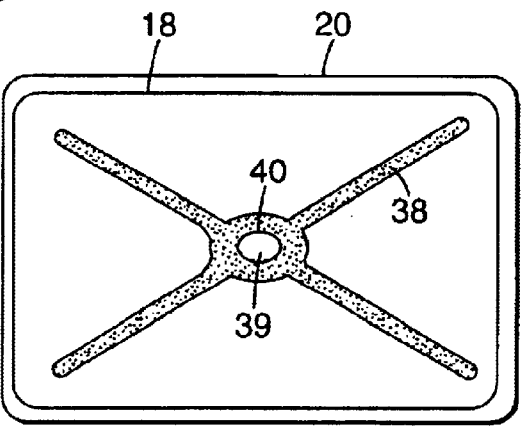
FIG. 5B is a top plan view of the CRT screen from FIG. 5A, representing the CRT after the anti-reflective glass has made contact with the center of the deposit of adhesive.
Figure 5C:
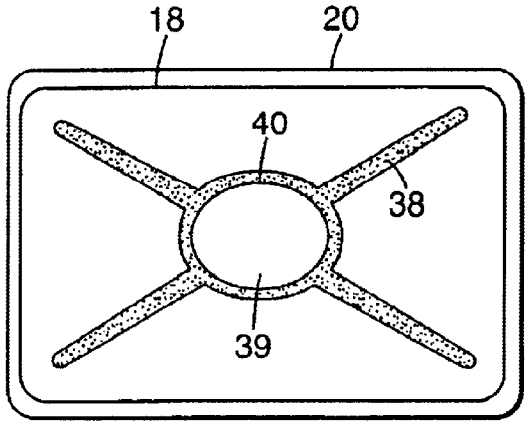
FIG. 5C is a top plan view of the CRT screen from FIG. 5B, representing the CRT after the anti-reflective glass has made additional contact with the adhesive to form a larger interface between the anti-reflective glass and the adhesive. Also, a contact front of the adhesive with the substrates is shown having moved outward from the center of the display toward the edges.

The process of release is illustrated by example in FIGS. 5A through 5D using an adhesive pattern in a substantially cross shape. In FIG. 5A adhesive 38 has been placed on the second substrate 20, but has not made contact with first substrate 18 (which is transparent and not shown). In FIG. 5B, first substrate 18 has made initial contact with adhesive 38 at an interface region 39 defined by contact front 40. Thus, interface region 39 is an area in which the first substrate, adhesive, and second substrate are in contact with one another. As shown in FIG. 5C, first substrate 18 continues to be released from the chuck and to return to its original shape (normally flat), and the interface region 39 expands across the first and second substrates 18, 20. At the same time, it will be noticed that adhesive 38 also typically expands outwardly across the substrates. A contact front 40, which is the border of the adhesive with the substrates, also expands toward the edges of the substrates. Eventually, adhesive 38 extends fully, or almost fully, across the substrates. This method of forming a small interface area and then expanding it across the surfaces of the substrates reduces entrapped air and gas bubbles by providing an opportunity for bubbles and air to escape along the contact front 40.

Figure 5D:
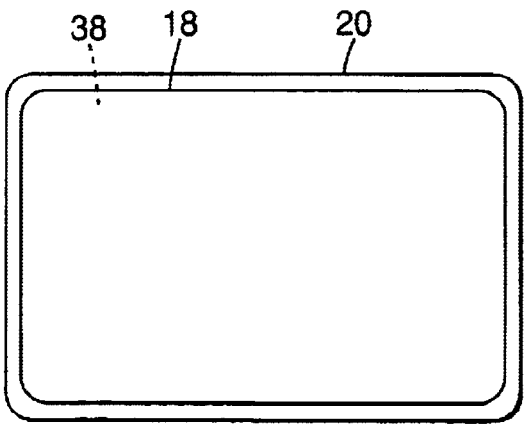
FIG. 5D is a top plan view of the CRT screen from FIG. 5C, representing the CRT after adhesive has spread under the entire sheet of anti-reflective glass.

In FIG. 5D, first substrate 18 is fully released and back to a flat or substantially flat shape it originally had prior to being deformed. Adhesive 38 has expanded across the substrates and has reached the edges of the first substrate 18. In other implementations, the adhesive will reach past the edges of the first substrate or almost to the edges of the first substrate.

In some specific implementations, the adhesive will reach all of the edges of the substrate except the corners. However, adhesive can be directed into the corners by various optional methods, including allowing for capillary action to draw the adhesive into the corners, pressing down on the first substrate proximate the corners to force adhesive into the corners, curing some of the adhesive proximate the edges of the first substrate (as described later), or by having excess adhesive originally placed on the second substrate to assure that enough adhesive reaches all portions of the second substrate. Note that a combination of these methods may be used to assure proper distribution of the adhesive. In addition, the desired properties of the finished product can impact the manner in which adhesive is added and spread. For example, if excessive adhesive at the edges is strongly discouraged, then methods other than adding excess adhesive should be used to provide sufficient adhesive.

Optionally, steps can be taken to improve the flow of the adhesive. For example, flow can be enhanced by warning the adhesive on the substrate in order to lower the viscosity of the adhesive and allow better flow.

Figure 6A:
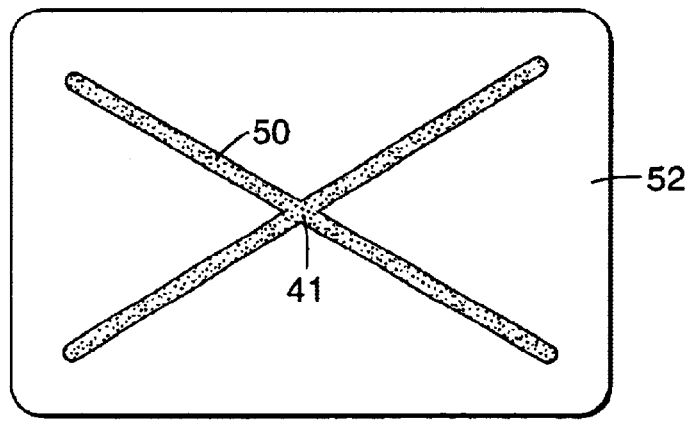
FIG. 6A is a top plan view of a first pattern for deposit of adhesive on the screen of a CRT in accordance with an implementation of the invention.
Figure 6B:
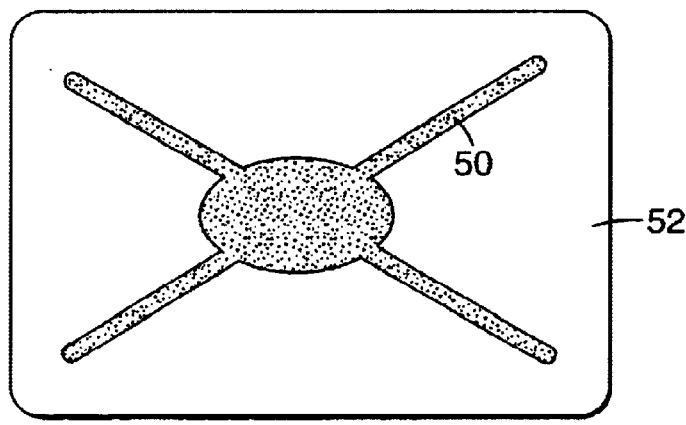
FIG. 6B is a top plan view of a second pattern for deposit of adhesive on the screen of a CRT in accordance with an implementation of the invention.
Figure 6C:
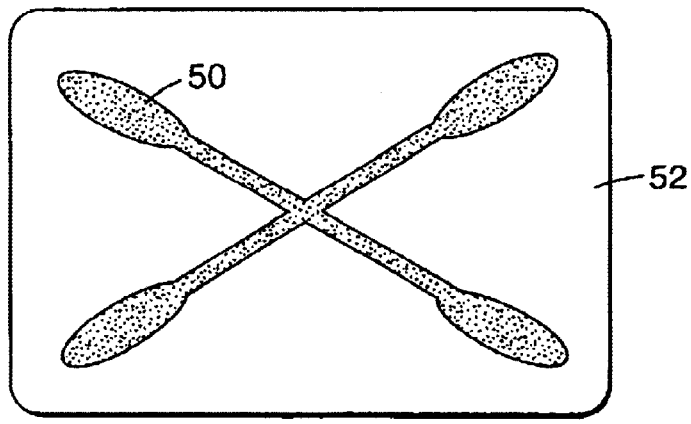
FIG. 6C is a top plan view of a third pattern for deposit of adhesive on the screen of a CRT.

FIGS. 6A through 6C show three possible initial distributions of adhesive. In FIG. 6A, the adhesive 50 is positioned in a substantially cross formation on the second substrate 52. The intersection 41 of the cross provides the preferable location for initial contact between the first substrate and adhesive 50. Other adhesive patterns are also possible, such as modified crosses shown in FIGS. 6B and 6C that contain greater amounts of adhesive 50 at the center and corners, respectively, of the second substrate 52. The adhesive pattern in FIG. 6B can be appropriate, for example, with an adhesive having a low viscosity which can more easily travel across the substrates to reach the edges. The adhesive pattern in FIG. 6C is appropriate to assist in getting adequate adhesive into the corners of the substrates.

Each of the patterns in FIGS. 6A through 6C has a substantially radial orientation or symmetry, with adhesive radiating out from the center of the substrates. Such radial arrangements can be advantageous in promoting successful migration of the adhesive across the surfaces of the substrates. The radial orientation assists in forming and advancing the interface and contact front because the contact front only obliquely makes contact with other adhesive. In this manner, entrapped bubbles are reduced or eliminated.

Figure 7:
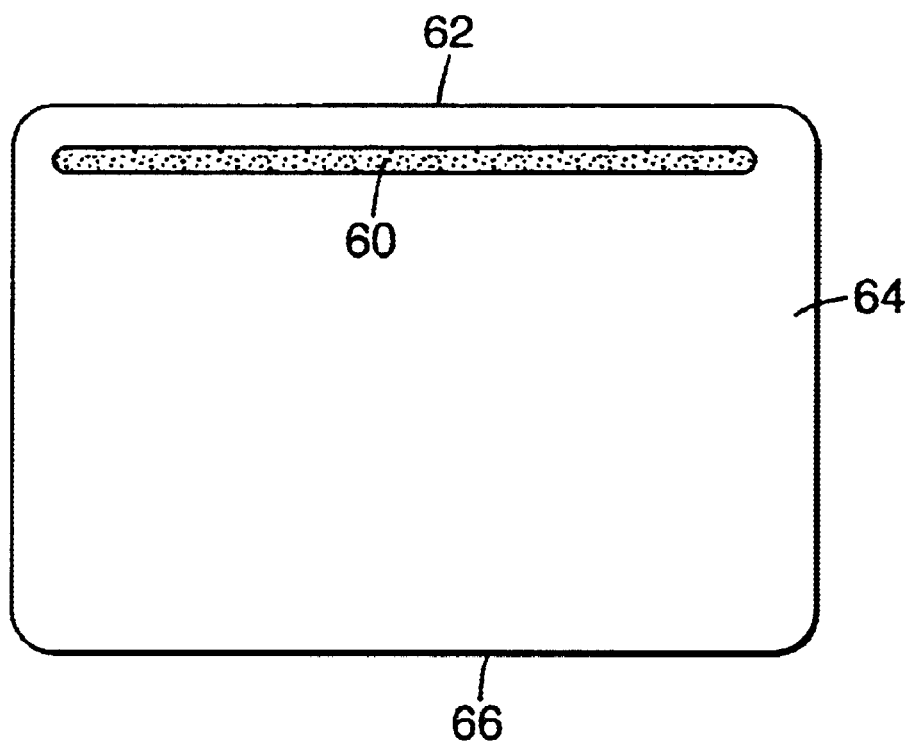
FIG. 7 is a top plan view of another pattern for deposit of adhesive on the screen of a CRT.

FIG. 7 shows another suitable pattern for dispensing adhesive 60. Adhesive 60 is positioned along an edge 62 of second substrate 64 so that it may migrate across substrate 64 to the opposite edge 66. A first substrate can be brought in contact with adhesive 60 along the entire length of the adhesive in a substantially linear initial interface region, and the contact front then migrates to the opposite edge as the interface region expands. It will be appreciated that various other patterns may be used having advantages for specific implementations, including some without radial symmetry or other symmetry. However, for most implementations it is not desirable to surround or substantially entrap areas of the second substrate with the adhesive.

After the adhesive has been distributed between the two substrates, it can be cured in order to provide a permanent bond. Thus, the adhesive composition is preferably a curable composition, including compositions that are heat cured and compositions that are cured by actinic radiation, including ultraviolet (UV) radiation.

In a specific implementation the adhesive is cured in at least two steps: a first step to cure a small amount of the adhesive to temporarily hold the first substrate in place, and a second step to cure the remaining adhesive. This two step procedure is advantageous because it allows inspection of the substrates between curing steps. This inspection confirms that the substrates are properly positioned, that the adhesive is adequately distributed, and that undesirable bubbles and foreign matter have not been entrapped between the substrates. If inspection indicates that any of these conditions has not been satisfied, then the substrates can be separated and cleaned, followed by repeating the process of adhesive deposit and joining of the substrates. In the event that one of the substrates is particularly inexpensive, it can be discarded and a new substrate used for the repeated process.

For example, if the first substrate is a piece of anti-reflective glass, and the second substrate is a cathode ray tube, then the present process allows for inspection of the anti-reflective glass prior to it being permanently secured to the cathode ray tube. If the inspection indicates an unacceptable flaw, then the anti-reflective glass is removed from the tube, the tube is cleaned, and a second piece of anti-reflective glass can be secured to the tube and partially cured. If inspection identifies that this second sheet of anti-reflective glass is properly applied, then the remaining portion of the adhesive is cured in order to permanently secure the anti-reflective glass to the tube. This method is economical and efficient because it avoids disposing of tubes that have potential flaws that are recognized only after curing.

Figure 8A:
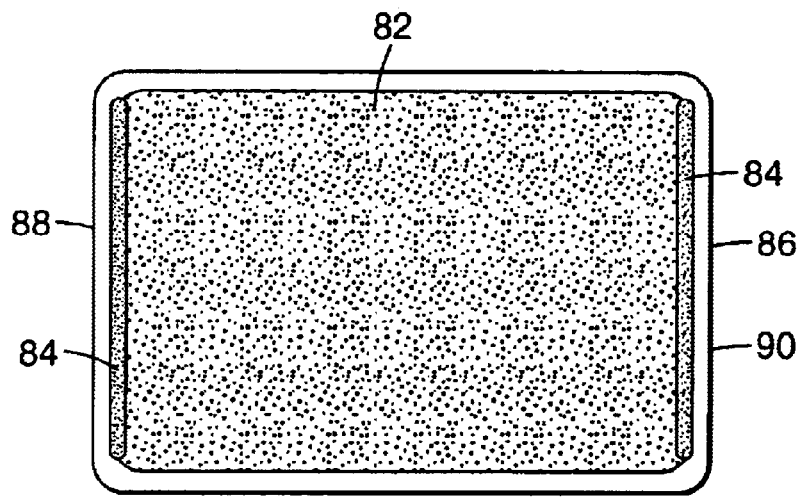
FIG. 8A is a top plan view of the screen of a CRT after a portion of the adhesive has been cured.
Figure 8B:
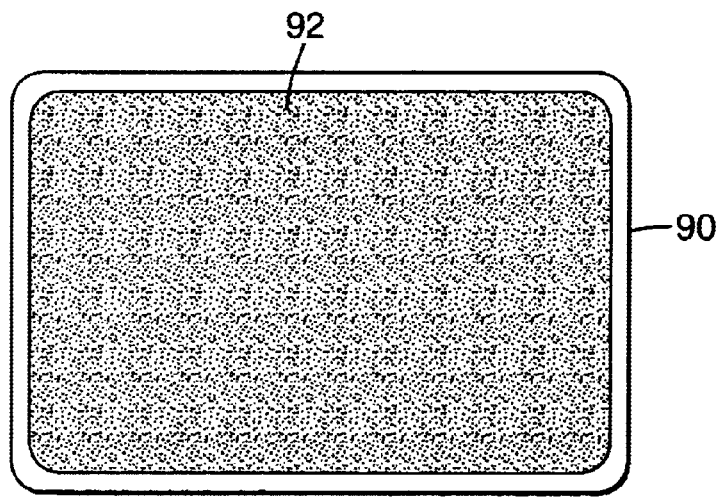
FIG. 8B is a top plan view of the screen of a CRT from FIG. 8A after the entire adhesive has been cured.

FIGS. 8A and 8B depict a manner by which such partial curing of the adhesive can be performed. In FIG. 8A, a large region 82 of adhesive exists, but only edge regions 84 are initially cured. Such curing occurs, for example, by irradiating the two edges 86, 88 of the substrate 90 with UV light. This curing can become automatic when the UV light is applied to the edge before the adhesive reaches it. The radiation should be sufficient to cure enough adhesive to hold the anti-reflective glass substrate in position for inspection. Such partial curing can also aid in the distribution of the remaining uncured adhesive, particularly in the corners of the substrates. After satisfactory inspection, the remaining portion of the adhesive is cured, as shown in FIG. 8B having all of the adhesive cured as represented by region 92.

In addition to the configuration depicted in FIG. 8A, it is possible to selectively cure other portions of the adhesive prior to inspection. In specific embodiments, the entire perimeter of the adhesive (normally corresponding to the edge of the first substrate) is cured, instead of only two edges. In other implementations three edges are cured, or just one edge is cured. It can be advantageous to cure all four edges because it prevents leakage of the adhesive from the edges of the substrate during subsequent movement and inspection of display. It can also be advantageous to cure three edges (of a four edge substrate) in certain implementations, because excess adhesive may be removed from the open edge. Similarly, if the adhesive is sufficiently fluid, it is possible in certain implementations to remove stray bubbles through this open edge without releasing adhesive from the other edges. Curing just one of the edges has the advantage of reducing the amount of cured adhesive that must be removed from the substrates if inspection indicates a flaw.

Two other implementations of partial curing of the adhesive are partial spot curing and partial edge curing. In partial spot curing, one or more spots of adhesive are cured in order to retain the substrate in place (such as spots at each corner, a center spot, or spots along the edges of the substrate). These implementations, too, benefit from reduced quantities of adhesive that must be removed if the substrates do not pass inspection. Partial edge curing comprises curing the majority of the perimeter of the adhesive, but leaving a portion uncured in order to release gases or excess adhesive. For example, in certain implementations of the invention the corners of a cathode ray tube receive the least amount of adhesive. Adhesive can be forced into the corners if the perimeter adhesive has been cured except for the corners. In such implementations, the adhesive will either independently flow into the corners or will be forced into the corners by applying pressure to other portions of the first substrate after the rest of the perimeter has been cured.

Although this discussion provides numerous specific methods and configurations for a two or more stage curing process, it will be appreciated that other methods and configurations are also possible using multiple stage curing. However, such methods should desirably permit inspection and separation of the substrates after a first curing step but before the final curing step.

The adhesive used to bond the first and second substrates should have sufficient cohesive strength and adhesion to each substrate that the two substrates can be permanently secured. The adhesive is preferably transparent, and has a cured refractive index approaching that of the substrates, particularly the refractive index of glass, to prevent undesirable optical effects. As used herein, transparent refers to materials that are substantially or completely transparent to light, in particular visible light. In addition, the adhesive should be relatively fast curing to allow rapid bonding of the substrates, and the adhesive should permit degassing prior to being dispensed and should have a viscosity which allows advancement of a contact front across the substrates without flowing off the edges of the substrates. The adhesive should also have a surface energy that allows wetting of the substrate during the laminating process without formation of bubbles.

The adhesive compositions of the invention overcome the challenges associated with lamination of rigid substrates to one another, including the disadvantages of previously known compositions for lamination. One of the most substantial challenges of laminating two rigid substrates together is that it is very difficult to laminate the substrates without entrapping air bubbles. Adhesives of the present invention, when used in accordance with the method of the invention, avoid entrapment of air bubbles due to their high wetting properties.

Difficulty in curing the adhesive is another substantial challenge associated with laminating rigid substrates that absorb light. Some substrates, including glass, absorb significant amounts of ultraviolet light that is normally considered necessary for photo-initiation of reactions. Adhesives of the present invention overcome this obstacle by permitting curing through one or more of the rigid substrates. In particular, the adhesives typically include an initiating agent or an initiating agent in conjunction with a sensitizing system that permits polymerization initiated by light passing through at least one of the rigid substrates.

Additional challenges exist when laminating transparent substrates. One such challenge with lamination of transparent substrates is that the adhesive should maintain clarity throughout the life of the laminated product and not show degradation or discoloration. When laminating transparent substrates, it is also important to consider the optical properties of the resulting laminate to ensure that the laminated product does not have inferior optical qualities. In this regard, specific implementations of the adhesive of the invention use non-crystalline compounds that cure to a refractive index approaching that of at least one of the substrates. By avoiding the formation of crystals and controlling the refractive index of the adhesive, the present invention allows light to pass between the substrates with minimal disruption.

The adhesive of the present invention is uniquely suited to successfully adhering rigid substrates, and specifically transparent rigid substrates, to one another by avoiding entrapment of air bubbles while allowing photo-initiation through the substrates to create a cured adhesive that is substantially transparent, close to the refractive index of at least one of the substrates, and non-crystalline.

The compositions of the invention are typically one-part, photo-copolymerizable, stable compositions having excellent shelf life, and are preferably photocurable even at room temperature or below. In preferred implementations the adhesive is a photopolymerizable epoxy resin-based composition having a refractive index matching, after polymerization, that of the substrates; and a viscosity suitable for dispensing onto one substrate without undesirable running of the resin prior to application of the other substrate. Also, the adhesive should typically be suitable for adhesion to the substrate without additional preparation of the substrate (such as corona treatment, acid etching, or priming).

Epoxy-containing materials useful in the adhesives of the invention include organic compounds having an oxirane ring polymerizable by ring opening. Such materials, broadly called epoxides, can be aliphatic, cycloaliphatic, aromatic or heterocyclic. The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The epoxides may be pure compounds but are generally mixtures containing one, two, or more epoxy groups per molecule. These materials generally have, on the average, at least 1.5 polymerizable epoxy groups per molecule (preferably two or more epoxy groups per molecule). The "average" number of epoxy groups per molecule is determined by dividing the total number of epoxy groups in the epoxy-containing material by the total number of epoxy molecules present. Useful epoxy-containing materials include cycloaliphatic epoxy resins such as 3,4-epoxycyclohexylmethyl-3,4-epoxycyclohexane carboxylate (e.g., sold under the trademark "Cyracure UVR 6110" from Union Carbide Corp.), and aromatic glycidyl ethers (e.g. sold under the trademark "Epon 828" from Shell Chemical Corp.).

The compositions can contain a photoinitiator, such as an aromatic iodonium or sulfonium complex salt, to initiate cure upon exposure to actinic radiation. Photoinitiator salts suitable for use with the invention include tetrafluoroborate ($BF_4$), hexafluorophosphate ($PF_6$), hexafluoroarsenate ($AsF_6$), and hexafluoroantimonate ($SbF_6$) salts used as precursors to the curing agents. The cationic portion of the initiator salts can be selected from the group consisting of organic onium salts, such as iodonium or sulfonium salts, including organic iodonium salts. Specific suitable photoinitiators include mixed sulfonium salts containing hexafluoroantimonate or hexafluorophosphate anions, such as those sold under the trade name "Cyracure UVI-6976" and "UVI-6992" by Union Carbide Corporation of Danbury, Conn.; and "Saracat CD-1010" and "CD-1011" by Sartomer Company of Exton, Pennsylvania.

Specific photoinitiators which are useful in the compositions of the invention include aromatic iodonium complex salts. Suitable examples of the aromatic iodonium complex salt photoinitiators include: diphenyliodonium tetrafluoroborate; diphenyliodonium hexafluorophosphate; diphenyliodonium hexafluoroarsenate; diphenyliodonium hexafluoroantimonate; di-(4-methylphenyl)iodonium tetrafluoroborate; di-(4-rnethylphenyl)iodonium hexafluorophosphate; di-(4-methylphenyl)iodonium hexafluoroantimonate; di-(4-methylphenyl)iodonium hexafluoroarsenate; phenyl-4-methylphenyliodonium tetrafluoroborate; phenyl-4-methylphenyl iodonium hexafluorophosphate; phenyl-4-methylphenyliodonium hexafluoroantimonate; phenyl-4-methylphenyliodonium hexafluoroarsenate; di-(4-heptylphenyl)iodonium tetrafluoroborate; di-(3-nitrophenyl) iodonium hexafluorophosphate; di-(4-chlorophenyl) iodonium hexafluorophosphate; di-(dodecylphenyl) iodonium tetrafluoroborate; di-(dodecylphenyl) iodonium hexafluorophosphate; di-(dodecylphenyl) iodonium hexafluoroarsenate; di-(dodecylphenyl) iodonium hexafluoroantimonate; di-(naphthyl)iodonium tetrafluoroborate; di-(4-trifluoromethylphenyl)iodonium tetrafluoroborate; di-(4-phenoxyphenyl)iodonium tetrafluoroborate; phenyl-2-thienyliodonium hexafluorophosphate; 3,5-dimethylpyrazolyl-4-phenyliodonium hexafluorophosphate; di-(2,4-dichlorophenyl) iodonium hexafluorophosphate; di-(4-bromophenyl)iodonium hexafluorophosphate; di-(4-methoxyphenyl)iodonium hexafluorophosphate; di-(3-carboxyphenyl)iodonium hexafluorophosphate; di-(3-methoxycarbonylphenyl)iodonium hexafluorophosphate; di-(3-methoxysulfonylphenyl)iodonium hexafluorophosphate; di-(4-acetamidophenyl)iodonium hexafluorophosphate; di-(2-benzothienyl)iodonium hexafluorophosphate; phenyl-4-(2-hydroxytetradecyloxy phenyl) iodonium tetrafluoroborate; phenyl-4-(2-hydroxytetradecyloxy phenyl) hexafluorophosphate; phenyl-4-(2-hydroxytetradecyloxy phenyl) hexafluoroarsenate; and phenyl-4(2-hydroxytetradecyloxy phenyl) hexafluoroantimonate. Advantageous photoinitiators include diphenyliodonium hexafluorophosphate; which has rapid curing speed, is reasonably priced, and has good availability. Additional advantageous photoinitiators include those formed with the following cations: diphenyliodonium; di-(4-methylphenyl) iodonium; di-(dodecylphenyl) iodonium; phenyl-(2-hydroxytetradecyloxyphenyl); and di-(4-heptylphenyl) iodonium. Preferred photoinitiators include those formed with the following anions: tetrafluoroborate; hexafluorophosphate; hexafluoroarsenate; and hexafluoroantimonate. Mixtures of these cations and anions may be used.

Of the aromatic iodonium complex salts which are suitable for use in the compositions of the invention, commonly used salts are the diaryliodonium hexafluorophosphate and the diaryliodonium hexafluoroantimonate. These salts are, in general, more thermally stable, promote faster reaction, and are more soluble in inert organic solvents than other aromatic iodonium salts of complex ions.

The aromatic iodonium complex salts may be prepared by metathesis of corresponding aromatic iodonium simple salts (such as, for example, the diphenyliodonium bisulfate) in accordance with the teachings of Beringer, et al., J. Am. Chem. Soc. 81, 342 (1959). The aromatic iodonium simple salts may be prepared in accordance with Beringer et al., above, by various methods including (1) coupling of two aromatic compounds with iodyl sulfate in sulfuric acid, (2) coupling of two aromatic compounds with an iodate in acetic acid-acetic anhydride-sulfuric acid, (3) coupling of two aromatic compounds with an iodine acylate in the presence of an acid, and (4) condensation of an iodoso compound, an iodoso diacetate, or an iodoxy compound with another aromatic compound in the presence of an acid.

The photoinitiator may be combined with a sensitizer that makes the photoinitiator more responsive to lower levels of light and to additional wavelengths of light. Such sensitizers can be particularly useful when one or more of the substrates includes an antireflective coating. Antireflective coatings generally decrease the intensity of the radiation that passes through the substrate. The decrease in intensity is typically not panchromatic; that is, the extent of decrease varies with the wavelength of the radiation. For example, the fraction of light having a wavelength below 330 nm transmitted by antireflective coatings is usually very low, generally less than 25 percent of the incident light. When used alone for initiation of polymerization, iodonium and unsubstituted tri-aryl sulfonium salts absorb little if any light having wavelengths above 330 nm, and therefore do not effectively initiate epoxy polymerization when exposed through transparent substrates coated with antireflective layers. Thus, sensitizers that absorb light at wavelengths for which anti-reflective coatings have high transmitance and at wavelengths emitted from available light sources are preferably selected for use with the compositions and methods of the invention. The photoinitiator and sensitizer, if any, should be selected such that the wavelength of the actinic radiation necessary to initiate the curing reaction can pass through one of the substrates with sufficient intensity to initiate the reaction.

The aromatic iodonium complex salts useful in the photopolymerizable compositions of the invention are typically photosensitive only in the ultraviolet spectrum. The complex salts can be sensitized to the near ultraviolet and the visible range of the spectrum by sensitizers for known photolyzable organic halogen compounds in accordance with the teachings of U.S. Pat. No. 3,729,313. Representative sensitizers include, e.g., anthracene, 9-methylanthracene, 2-ethyl-9,10-dimethoxyanthracene, 9,10-diethoxy anthracene, camphorquinone, and 1,3-diphenylisobenzofuran. The sensitizer should preferably be reactive to light in the visible or near ultraviolet region, particularly in implementations where the radiation must pass though a UV-light absorbing glass. Therefore, the sensitizer is preferably reactive to light having a wavelength of greater than 350 nm.

The curing of the adhesive is preferably a triggered polymerization reaction. Once the degradation of the iodonium complex salt has been initiated by exposure to a radiation source, the polymerization reaction proceeds and will continue after the radiation source is removed. The use of thermal energy during or after exposure to a radiation source will generally accelerate the polymerization reaction, and even a moderate increase in temperature may greatly accelerate polymerization rate. The rate of polymerization generally increases with increasing amounts of complex salt at a given light exposure or irradiation. The rate of polymerization also increases with increasing light intensity or electron dosage. For those compositions wherein a sensitizer is used to make the composition sensitive to radiation of longer wavelength, about 0.01 to 0.8 part and preferably about 0.03 to 0.5 parts by weight of sensitizer per part of aromatic complex salt is employed.

As discussed above, the adhesive preferably has a refractive index corresponding closely to that of at least one, and preferably both, of the rigid substrates. In order to control the refractive index of the adhesive, ingredients may be added to change its optical properties. For example, co-reactive compounds may be added to increase the refractive index. Suitable co-reactive compounds include molecules containing aromatic groups, including bisphenol-A based resins. Depending upon the desired use, the refractive index of the cured resin may be increased or decreased. Generally, the refractive index of the adhesive, upon polymerization, is within 0.010 of the refractive index of at least one of the substrates More typically, the refractive index is within 0.005 of the refractive index of at least one of the substrates. When those substrates are glass, it is typically necessary to increase the refractive index of the cured resin, such as by adding aromatic compounds, halogenated compounds, or sulfur-containing compounds. In specific embodiments, brominated compounds may be used. In other implementations it can be desirable to decrease the refractive index. In such implementations it is possible to use fluorinated resins, such as fluorinated epoxy resins. Maruno, T.; Nakamura, K. in J. Appl. Polym. Sc. 1991, 42(8), 2141–2148 demonstrate the use of fluorinated epoxy resins to lower the refractive index of the adhesives to approximately 1.52. Although these resins can reduce the refractive index, they are relatively expensive and the presence of fluorine groups can be detrimental in electronic applications. Thus, non-halogenated epoxy resins are preferred.

In accordance with the discussion above, it is also desirable to control the viscosity of the adhesive composition so that it is not so high that it promotes entrapped air bubbles, yet not so low that it runs off of the substrates before curing. The viscosity should be high enough to retain the adhesive on the substrates without running of the edges, but not so high that the adhesive does not flow well and results in entrapped air bubbles. The viscosity of the adhesive may be altered by the addition of co-reactive ingredients that raise or lower its viscosity. For example, polyether polyols and polyesters may be added to modify viscosity. As used herein, polyols include materials having multiple hydroxyl functional groups, and can also include other functional groups. When using the adhesive in an optical application with a transparent adhesive, it is preferred that the polyols do not contain crystalline groups because such groups can adversely impact the optical clarity of the cured adhesive. The room temperature Brookfield viscosity range of the adhesive composition is typically 100 to 10,000 centipoise, more typically 100 to 1000 centipoise, and even more typically 100 to 500 centipoise. In addition, to avoid entrapped bubbles, the adhesive preferably has an application vapor pressure of less than 25 mm at 25° C.

Stabilizers preventing color formation during polymerization and under conditions of use may be added to the composition. Examples include tin compounds such as dibutyltin dilaurate, dibutyltin maleate, dibutyltin bis (isooctylmercaptoacetate), dibutyl di-(dodecylthio) tin, dibutyldiphenyl tin, and esters of boric acid.

In order to increase the wetting of the adhesive, epoxy copolymerizable additives such as coupling agents may be added to the composition. Examples of such additives include epoxy functional alkoxy silane coupling agents.

To prevent entrapment of air bubbles during the lamination process, the adhesive should show a strong affinity for the substrate, as evidenced by readily wetting the substrates. A useful measure of the adhesive's affinity for the substrates is the static contact angle of the adhesive, which may be determined using a goniometer. An untreated glass microscope slide provides a reasonable model for the glass substrates identified in this application, and the adhesive should have a static contact angle at room temperature on an untreated glass microscope slide of less than 90 degrees in order to prevent bubble formation during the lamination process. More typically, the contact angle of the adhesive on a microscope slide should be less than 45 degrees. Most typically, the contact angle of the adhesive on a microscope slide should be less than 30 degrees to allow bubble-free lamination in a reasonable time period.

Suitable adhesives typically have from 60 to 99.3 percent epoxy resin by weight, and even more typically from 70 to 80 percent epoxy resin by weight. When ingredients are added to adjust the refractive index (such as aromatic epoxy resins to increase reactive index) or viscosity of the adhesive, they are typically added in a range of 0 to 40 percent by weight, and more typically from 5 to 40 percent by weight. For example, 30 percent by weight of an aliphatic polyester polyol sold under the trademark "Rucoflex F-2310" from Ruco Polymer Corporation of Hicksville, N.Y. can be added to adjust the viscosity. The initiator is typically added at a level from 0.1 to 4.0 percent by weight, and more typically from 0.5 to 3.0 percent by weight of the adhesive. When a sensitizer is used, it is typically from about 0.01 to 0.8 percent by weight, and more typically from 0.03 to 0.5 percent by weight.

Two suitable adhesive composition examples are provided below. The ingredients used in the compositions include:

A dicycloaliphatic diepoxide sold under the trademark "Cyracure UVI-6110" by hew Union Carbide Corporation of Danbury, Conn., is susceptible to acid catalyzed ring opening that homopolymerizes to give a hard, brittle glassy material.

An aromatic epoxy resin sold under the trademark "Epon 828" by from Shell Chemical Corporation of Houston, Tx., increases the refractive index of the cured adhesive and adds rigidity.

An aliphatic polvester triol sold under the trademark "Rucoflex F-2310", by Ruco Polymer Corporation of Hicksville, N.Y., has terminal hydroxy groups which react with opened epoxy groups to give copolymers with modified physical properties.

A poly(ethylene oxide) sold under the trademark "Carbowax 400", by Union Carbide of Danbury, Conn., has terminal hydroxy groups which react with opened epoxy groups to give copolymers having modified physical properties.

A glycidyl ether functional trialkoxysilane coupling agent sold under the trademark "Silquest A-187", by Witco of Stamford, Conn.

A UV sensitizer sold under the trademark "Anthracene", by Aldrich Chemical Conmpany of Milwaukee, Wis.

A diaryliodonium salt sold under the trademark "Saracat CD-1012", by Sartomer of Exton, Pa., generates a Bronsted (protic) acid that catalyzes the epoxy ring opening and siloxane hydrolysis reactions. Upon exposure to ultraviolet light, the sensitizer in combination with the iodonium salt begins the curing process.

A diaryliodonium salt sold under the trademark "Saracat CD-1011", by Sartomer of Exton, Pa., is a diaryliodenium salt.

A polyether polyol sold under the trademark "Pluracol TP-740", by BASF Corporation of Wyandotte, Mich., is a used for modifying the viscosity of the adhesive and for modifying the properties of the cured adhesive.

A color stabilizer sold under the trademark "Dibutyldiphenyl tin", by Strem Chemical of Newbury, Mass., is a color stabilizer.

A color stabilizer sold under the trademark "dibutyltin bis(isooctylmercaptoacetate)", by Gelest of Tullytown, Pa.

Surfactants (surface energy modifiers) may optionally be used. Additives, such as antioxidants, can be include to prevent color formation during the curing process and during use.

Three example formulations are provided below for creating the uncured adhesive:

Example Formulation 1

| Component | Parts by Weight |
|---|---|
| Cyracure UVR-6110 | 70.0 |
| Rucoflex F-2310 | 30.0 |
| Silquest A-187 | 2.0 |
| Diphenyliodonium hexafluorophosphate | 2.0 |
| Anthracene | 0.4 |
| dibutyl diphenyl tin | 1.0 |

Example Formulation 2

| Component | Parts by Weight |
|---|---|
| Cyracure UVR-6110 | 60.0 |
| Epon 828 | 11.0 |
| Carbowax 400 | 24.0 |
| Pluracol TP-740 | 5.0 |
| SARCAT CD-1012 | 1.0 |
| 9,10-Diethoxy anthracene | 0.05 |
| Silquest A-187 | 0.5 |
| dibutyltin bis(isooctylmercapto acetate) | 0.5 |

Example Formulation 3

| Component | Parts by Weight |
|---|---|
| Cyracure UVR-6110 | 73.5 |
| Epon 828 | 4.5 |
| Carbowax 400 | 18.5 |
| SARCAT CD-1011 | 3.0 |
| Silquest A-187 | 0.5 |

Figure 9:
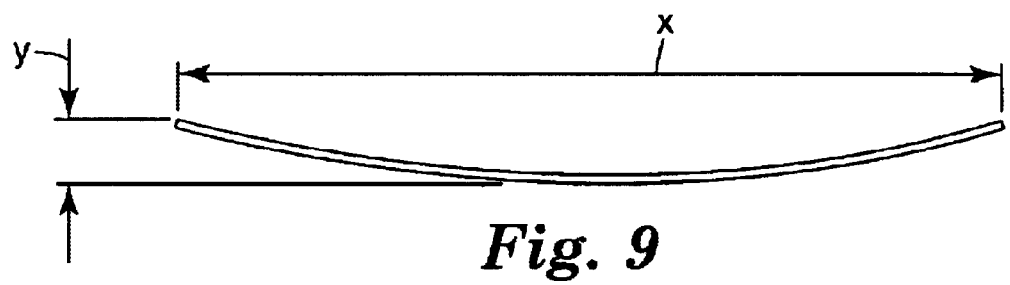
FIG. 9 is a depiction of a curve showing parameters for measuring the extent of curvature.

With regard to the substrates, the first substrate should desirably be rigid, yet have enough flexibility to be sufficiently distorted to create a suitable curvature. Thus, as used herein, the term rigid includes substrates having sufficient flexibility to create slight distortions in the surface. An example of suitable rigid materials are glass materials. In reference now to FIG. 9, a side view of a rigid first substrate 94 is shown depicting distortion of substrate 94 to create a curve. Such distortion is created, for example, by conforming the substrate to a chuck (as described above). The general curvature of substrate 94 can be described by reference to the ratio of the vertical displacement "y" of the substrate edges divided by the width "x" of the substrate along the curve 94. This displacement ratio, y/x, provides an indication of the extent of curvature. A substrate having little curvature will have a displacement ratio approaching zero, while a substrate with significant curvature will have a greater displacement ratio.

Typically the curve will be sufficient to form a contact front that advances without entrapment of air bubbles. The curvature should be sufficient that a well defined contact front forms. If the curve is too shallow (having a low displacement ratio), then entrapment of bubbles increases. Thus, the curvature should be adequate to reduce entrapment of bubbles while avoiding excessive bending of the substrate that can result in breaking of the first substrate. In addition, the substrate is preferably not excessively curved because release of such substrates from the chuck can result in the substrate returning to the original shape too rapidly and entrapping air bubbles.

Various different degrees of curvature are proper. Thus the ratio of distortion should be greater than zero, and always less than the amount necessary to break the rigid substrate. The ratio of distortion is often greater than 0.006, and typically greater than 0.013. The ratio of distortion is often less than 0.100, and typically less than 0.025.

This description of the curve in the first substrate, including the ratio of distortion, is provided only for an indication of suitable curves in the first substrate. It will be appreciated that curves outside of this range can also be suitable in certain implementations, including complex curves (curves with more than one convex or concave surface) and dynamic curves (curves that change during performing the process of the invention).

Typically, the first rigid substrate is a thin sheet of glass, which will have adequate flexibility for the methods and process of the invention. The glass is typically less than 3.3 millimeters in thickness, and more typically less than 1.6 millimeters in thickness. However, various thicknesses of this first rigid substrate are appropriate provided a curve can be formed in the substrate. The second rigid substrate is not typically deformed during application of the first rigid substrate. Therefore, the second rigid substrate can be as rigid, or more rigid, than the first rigid substrate. The first rigid substrate will typically have a modulus of at least $1.2 \times 10^7$ psi (82 Gpa), and preferably a modulus of at least $0.8 \times 10^7$ psi (55 Gpa).

Figure 10:
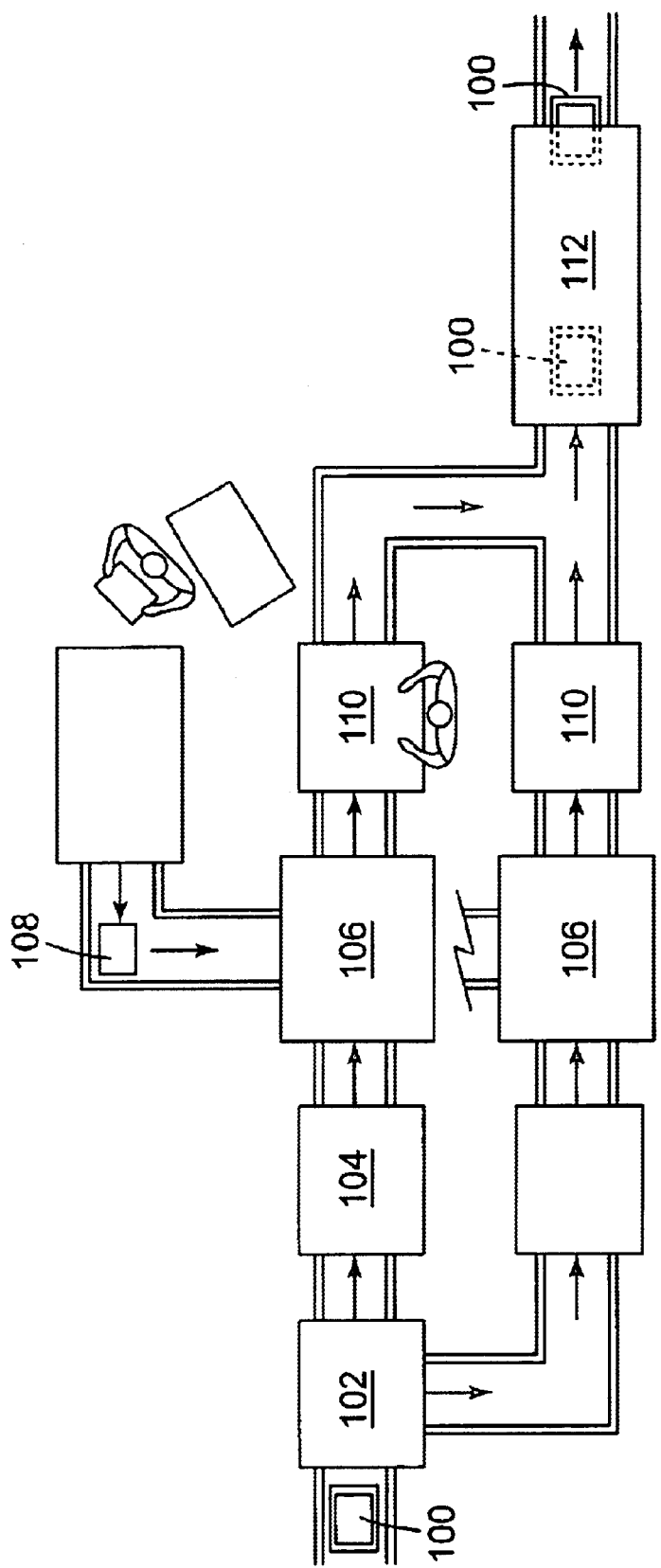
FIG. 10 is a plan view of a system for performing lamination in accordance with the invention.

A system for implementation of the present invention is shown in FIG. 10. In this exemplary system, anti-reflective glass panels are adhered to the screen of CRT displays. CRT's 100 move along a transport system to an optional measurement station 102. Measurement station 102 is used to determine the individual characteristics and irregularities of each CRT 100. Measurement station 102 may include an apparatus for determining the surface contour of the each CRT, particularly when the CRT's demonstrate significant variations.

After this optional measurement step, each CRT advances to an adhesive dispenser station 104, of which two are shown in FIG. 10. Adhesive dispenser station 104 distributes adhesive over the CRT screen. In the event that the CRT shows significant surface variations, the adhesive can be distributed accordingly to provide a favorable interface. Also, adhesive dispenser station 104 is preferably suited to dispense adhesive on CRTs of multiple sizes. Thus, the system may be used on different sizes of CRT's over time.

After application of the adhesive, the CRT is moved to a lamination station 106. At lamination station 106, an anti-reflective glass panel 108 is positioned on the CRT in a manner in accordance with the invention. In particular, glass panel 108 is positioned on the CRT so as to provide an expanding adhesive interface that avoids entrapment of bubbles. Glass panel 108 is preferably partially cured to the CRT 100 at lamination station 106, and then moves to an inspection station 110. At inspection station 110 the CRT is inspected for imperfections, including the position of glass panel 108 and the existence of entrapped air bubbles. If the CRT passes the inspection, it continues to a curing station 112, where the remaining adhesive is cured.

In the embodiment depicted, the adhesive is cured by exposure to UV radiation. In other embodiments, other wavelengths of actinic radiation are used to initiate or propagate the cure, or other curing methodologies are used (such as thermal initiation or propagation). If the CRT does not pass the inspection, it is either discarded or sent to a recycling station (not shown) where the anti-reflective glass is removed and the CRT prepared for reentry into the system at the measurement or adhesion stations.

Inspection of each CRT can be performed by human operators, by automatic inspection equipment, or by a combination of the two. For example, machine vision techniques can be used to search for and detect visual irregularities in the display during inspection of each CRT.

The system depicted in FIG. 10 shows additional adhesive stations, lamination stations, and inspection stations connected in parallel to the measurement station and cure station. The system demonstrates an example wherein only one measurement station and one curing station are necessary for two adhesive stations and two lamination stations. In other implementations, more or fewer of each type of station will be used depending upon the speed of each step. Generally, the number of stations will be dictated by the speed at which the station performs its operation. If a station can perform an operation quickly, then fewer of such stations are necessary compared to slower stations.

In variations on the system the CRT can be stationary while the adhesive is dispensed, the anti-reflective glass added, and the initial curing and inspection performed. Thus, the functionality of the depicted system is important, but various embodiments for performing these functions are contemplated.

The entire system is preferably interconnected by one or more controllers that monitor and adjust the lamination process. The controller should dictate movement of CRTs through the system, and also make adjustments to operation of the system. For example, if one of the adhesive dispensers becomes inoperable, then the CRT's should be directed to the other adhesive dispensers until the inoperable dispenser is returned to activity. Similarly, if inspection identifies a recurring flaw in the adhesive distribution, then adhesive dispenser 104 is adjusted to correct the problem. An example of such adjustments may include modifying the quantity and distribution of adhesive, or changing the temperature or gas content of the adhesive.

Other embodiments of the invention will be apparent to those skilled in the art from consideration of the specification and practice of the invention disclosed herein. It is intended that the specification and examples be considered as exemplary only, with a full scope and spirit of the invention being indicated by the following claims.

What is claimed is:

1. A laminated article, the article comprising:
   a first rigid substrate and a second rigid substrate; and
   a photocurable adhesive composition applied between the first and second substrates, the adhesive including:
   (a) at least one epoxy resin, and
   (b) a photosensitive initiating system activatable by light transmitted through at least one of the substrates, said substrate having less than 25 percent transmission of light at a wavelength of 330 nm;
   wherein the photocurable adhesive composition has a Brookfield viscosity at 25° C. of less than 500 centipoise prior to application, and a refractive index after curing within 0.01 of at least one of the first and second rigid substrates.

2. The laminated article of claim 1, wherein the epoxy resin comprises a glycidyl ether.

3. The laminated article of claim 1, wherein the epoxy resin comprises a cycloaliphatic epoxy resin.

4. The laminated article of claim 1, wherein the adhesive further comprises an epoxy co-reactive component.

5. The laminated article of claim 4, wherein the epoxy co-reactive component is a polyol.

6. The laminated article of claim 5, wherein the polyol is selected from the group consisting of poly(alkylene oxides), polyesters, polycaprolactones, and combinations thereof.

7. The laminated article of claim 5, wherein the polyol is non-crystalline.

8. The laminated article of claim 1, wherein the photosensitive initiating system comprises an onium photosensitive initiating system.

9. The laminated article of claim 8, wherein the photosensitive initiating system comprises an aromatic iodonium complex and a sensitizer.

10. The laminated article of claim 9, wherein the sensitizer is selected from the group consisting of anthracene, 9,10-diethoxyanthracene, 2-ethyl-9,10-dimethoxyanthracene, 9-methylanthracene, camphorquinone, 1,3-diphenylisobenzofuran, and combinations thereof.

11. The laminated article of claim 1, wherein the photosensitive initiating system comprises an aromatic sulfonium complex.

12. The laminated article of claim 1, wherein the adhesive has an application vapor pressure of less than 25 mm at 25° C.

13. The laminated article of claim 1, wherein the uncured composition forms a contact angle of less than 30 degrees with a glass substrate.

14. The laminated article of claim 1, further comprising a color prevention additive selected from the group consisting of dibutyldiphenyl tin, dibutyltin dilaurate, dibutyltin maleate, dibutyltin bis(isooctylmercapto acetate), dibutyl di-(dodecylthio)tin, and combinations thereof.

15. The laminated article of claim 1, further comprising a silane coupling agent that is copolymerizable with the epoxy resin.

16. The laminated article according to claim 1, wherein the photocurable adhesive composition is cured by actinic radiation.

17. A laminated article, the article comprising:
   a first rigid substrate and a second rigid substrate; and
   a photocurable adhesive composition applied between the first and second substrates, the adhesive including:
   (a) at least one epoxy resin,
   (b) an onium photosensitive initiating system activatable by light having a wavelength greater than 350 nm, and
   (c) a Brookfield viscosity at 25° C. of less than 500 centipoise prior to application; and a refractive index after curing within 0.01 of at least one refractive index of the first and second rigid substrates.

18. A laminated article, the article comprising:
   a first rigid substrate and a second rigid substrate; and
   a photocurable adhesive composition applied between the first and second substrates, the adhesive including:
   (a) at least one epoxy resin, and
   (b) an onium photosensitive initiating system activatable by transmission through at least one of the substrates wherein the substrate has less than 25 percent transmission of light at a wavelength of 330 nm.

* * * * *

UNITED STATES PATENT AND TRADEMARK OFFICE
CERTIFICATE OF CORRECTION

PATENT NO. : 6,706,403 B1
DATED : March 16, 2004
INVENTOR(S) : Olofson, Peter M.

Page 1 of 1

It is certified that error appears in the above-identified patent and that said Letters Patent is hereby corrected as shown below:

Column 1,
Line 50, after "and" delete "a".

Column 7,
Line 17, delete "warning" and insert in place thereof -- warming --.

Column 10,
Line 45, delete "epoxycyclobexane" and insert in place thereof -- epoxycyclohexane --.

Column 11,
Line 6, delete 'methylphenyl" and insert in place thereof -- methylphenyl --.

Column 14,
Line 25, delete "UVI" and insert in place thereof -- UVR --.
Line 25, after "by" delete "hew".
Line 30, after "by" delete "from".
Line 33, delete "polvester" and insert in place thereof -- polyester --.
Line 47, delete "Conmpany" and insert in place thereof -- Company --.
Lines 56 and 57, after "Pa." delete ", is a diaryliodenium salt".
Line 60, after "is" delete "a".
Line 64, after "Mass." delete ", is a color stabilizer.".

Column 17,
Line 49, delete "fill" and insert in place thereof -- full --.

Column 18,
Line 60, after "by" insert -- light --.

Signed and Sealed this

Sixteenth Day of August, 2005

JON W. DUDAS
*Director of the United States Patent and Trademark Office*